United States Patent
Jou

(10) Patent No.: US 8,879,481 B2
(45) Date of Patent: *Nov. 4, 2014

(54) METHOD AND APPARATUS FOR COMMUNICATIONS OF DATA RATE CONTROL INFORMATION IN A COMMUNICATION SYSTEM

(75) Inventor: Yu-Cheun Jou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 13/079,403

(22) Filed: Apr. 4, 2011

(65) Prior Publication Data

US 2011/0243082 A1    Oct. 6, 2011

Related U.S. Application Data

(63) Continuation of application No. 11/512,876, filed on Aug. 29, 2006, now Pat. No. 7,924,781, and a continuation of application No. 09/965,205, filed on Sep. 25, 2001, now Pat. No. 7,103,021.

(51) Int. Cl.
| | |
|---|---|
| *H04W 4/00* | (2009.01) |
| *H04W 72/00* | (2009.01) |
| *H04B 7/216* | (2006.01) |
| *H04W 28/22* | (2009.01) |
| *H04W 24/00* | (2009.01) |

(52) U.S. Cl.
CPC .............. *H04W 28/22* (2013.01); *H04W 24/00* (2013.01)
USPC ........... 370/329; 370/335; 370/342; 455/450; 455/509; 455/517

(58) Field of Classification Search
USPC ........... 370/329, 335, 342; 455/450, 509, 517
See application file for complete search history.

(56) References Cited

U.S. PATENT DOCUMENTS

| | | |
|---|---|---|
| 5,321,542 A | 6/1994 | Freitas et al. |
| 5,841,806 A | 11/1998 | Gilhousen et al. |
| 5,857,147 A | 1/1999 | Gardner et al. |
| 5,920,552 A | 7/1999 | Allpress et al. |

(Continued)

FOREIGN PATENT DOCUMENTS

| | | |
|---|---|---|
| CN | 1290431 A | 4/2001 |
| JP | 2000050352 | 2/2000 |

(Continued)

OTHER PUBLICATIONS

3GPP2: "cdma2000 High Rate Packet Data Air Interface Specification C.S0024" XP002223268, Sep. 2000, pp. 9-33, line 3—p. 9-34, line 11.

(Continued)

*Primary Examiner* — Alpus H Hsu
(74) *Attorney, Agent, or Firm* — Paul Kuo

(57) ABSTRACT

In a communication system, a method and an apparatus provide for efficient communications of data rate control information. A mobile station communicates a request on a data channel for reception of a data file on a traffic channel. The mobile station communicates data rate control information on a data rate control channel. The communication of data rate control information on the data rate control channel is ceased if the delivery of the data file on the traffic channel from a base station to the mobile station or a reverse traffic channel from the mobile station to the base station is concluded.

18 Claims, 5 Drawing Sheets

(56) References Cited

U.S. PATENT DOCUMENTS

| | | |
|---|---|---|
| 6,137,789 A | 10/2000 | Honkasalo |
| 6,154,652 A | 11/2000 | Park et al. |
| 6,205,129 B1 | 3/2001 | Esteves et al. |
| 6,208,624 B1 | 3/2001 | Tanno et al. |
| 6,219,343 B1 | 4/2001 | Honkasalo et al. |
| 6,366,779 B1 | 4/2002 | Bender et al. |
| 6,377,800 B1 | 4/2002 | Cho |
| 6,510,148 B1 | 1/2003 | Honkasalo |
| 6,560,211 B2 | 5/2003 | Esteves et al. |
| 6,574,211 B2 | 6/2003 | Padovani et al. |
| 6,621,809 B1 | 9/2003 | Lee et al. |
| 6,678,257 B1 | 1/2004 | Vijayan et al. |
| 6,724,740 B1 | 4/2004 | Choi et al. |
| 6,724,742 B1 | 4/2004 | Mun et al. |
| 6,731,937 B1 | 5/2004 | Spinner |
| 6,747,963 B1 | 6/2004 | Park et al. |
| 6,834,190 B1 | 12/2004 | Lee et al. |
| 6,882,632 B1 | 4/2005 | Koo et al. |
| 6,937,640 B2 | 8/2005 | Yun et al. |
| 6,973,098 B1 | 12/2005 | Lundby et al. |
| 7,039,029 B2 | 5/2006 | Lee et al. |
| 7,054,290 B1 | 5/2006 | Djuphammar |
| 7,058,031 B2 | 6/2006 | Bender et al. |
| 7,058,408 B2 | 6/2006 | Morgan et al. |
| 7,068,683 B1 | 6/2006 | Lundby et al. |
| 7,103,021 B2 | 9/2006 | Jou |
| 7,924,781 B2 | 4/2011 | Jou |
| 2002/0039355 A1 | 4/2002 | Yun et al. |
| 2003/0223396 A1 | 12/2003 | Tsai et al. |

FOREIGN PATENT DOCUMENTS

| | | |
|---|---|---|
| JP | 2001189693 | 7/2001 |
| JP | 2002010363 | 1/2002 |
| KR | 1020000047978 | 7/2000 |
| WO | WO0035126 | 6/2000 |
| WO | WO0062456 | 10/2000 |
| WO | WO0199312 | 12/2001 |

OTHER PUBLICATIONS

International Search Report—PCT/US2002/030438, International Search Authority—European Patent Office—Jan. 10, 2003.

METHOD AND APPARATUS FOR COMMUNICATIONS OF DATA RATE CONTROL INFORMATION IN A COMMUNICATION SYSTEM

CROSS-REFERENCE TO RELATED APPLICATIONS

The present Application for Patent is a continuation of patent application Ser. No. 11/512,876, filed Aug. 29, 2006, which is a continuation of patent application Ser. No. 09/965, 205, filed Sep. 25, 2001, entitled "Method and Apparatus for Communications of Data Rate Control Information in a CDMA Communication System" which issued as U.S. Pat. No. 7,103,021 on Sep. 5, 2006 and assigned to the assignee hereof and hereby expressly incorporated by reference herein.

BACKGROUND

I. Field

The present invention relates generally to the field of communications, and more particularly, to communications in a cellular communication system.

II. Background

In code division multiple access (CDMA) communication systems, unnecessary and excessive transmission by a user may cause interference to other users in addition to reducing the system capacity. The communication services in a cellular communication system may include wireless radio transmission of digitized speech, still or moving images, text messages and other types of data. For providing such services, a base station may attempt to communicate to a mobile station on a traffic channel at a data rate that is most recently requested by the mobile station. The mobile station may make the data rate request on a data rate control channel. The mobile station may communicate continuously a data rate control information to the base station in every time slot on the data rate control channel. The base station, however, at different times may not have any data for transmission to the mobile station on the traffic channel. As such, transmission of the data rate control information on the data rate control channel by the mobile station may be excessive and unnecessary at different times.

To this end as well as others, there is a need for a method and apparatus for efficient communications of the data rate control information in a communication system.

SUMMARY

In a code division multiple access communication system, a method and an apparatus provide for efficient communications of data rate control information. A mobile station communicates a request on a data channel for delivery of a data file on a forward link traffic channel. In response to the request, a transmitter in the mobile station starts a communication of data rate control information on a data rate control channel. After concluding the reception of a requested data file by a receiver in the mobile station, the mobile station transmitter ceases transmission of the data rate control information on the data rate control channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Various embodiments of the invention may be incorporated in a wireless communication system operating in accordance with the code division multiple access (CDMA) technique which has been disclosed and described in various standards published by the Telecommunication Industry Association (TIA). Such standards include the TIA/EIA-95 standard, TIA/EIA-IS-2000 standard, IMT-2000 standard and WCDMA standard, all incorporated by reference herein. A system for communication of data is also detailed in the "TIA/EIA/IS-856 cdma2000 High Rate Packet Data Air Interface Specification," incorporated by reference herein, may be more particularly capable of incorporating various embodiments of the invention. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as WCDMA standard may be obtained by contacting 3GPP Support Office, 650 Route des Lucioles-Sophia Antipolis, Valbonne-France.

Generally stated, a novel and improved method and an accompanying apparatus provide for an effective communications of the data rate control information in a CDMA communication system. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
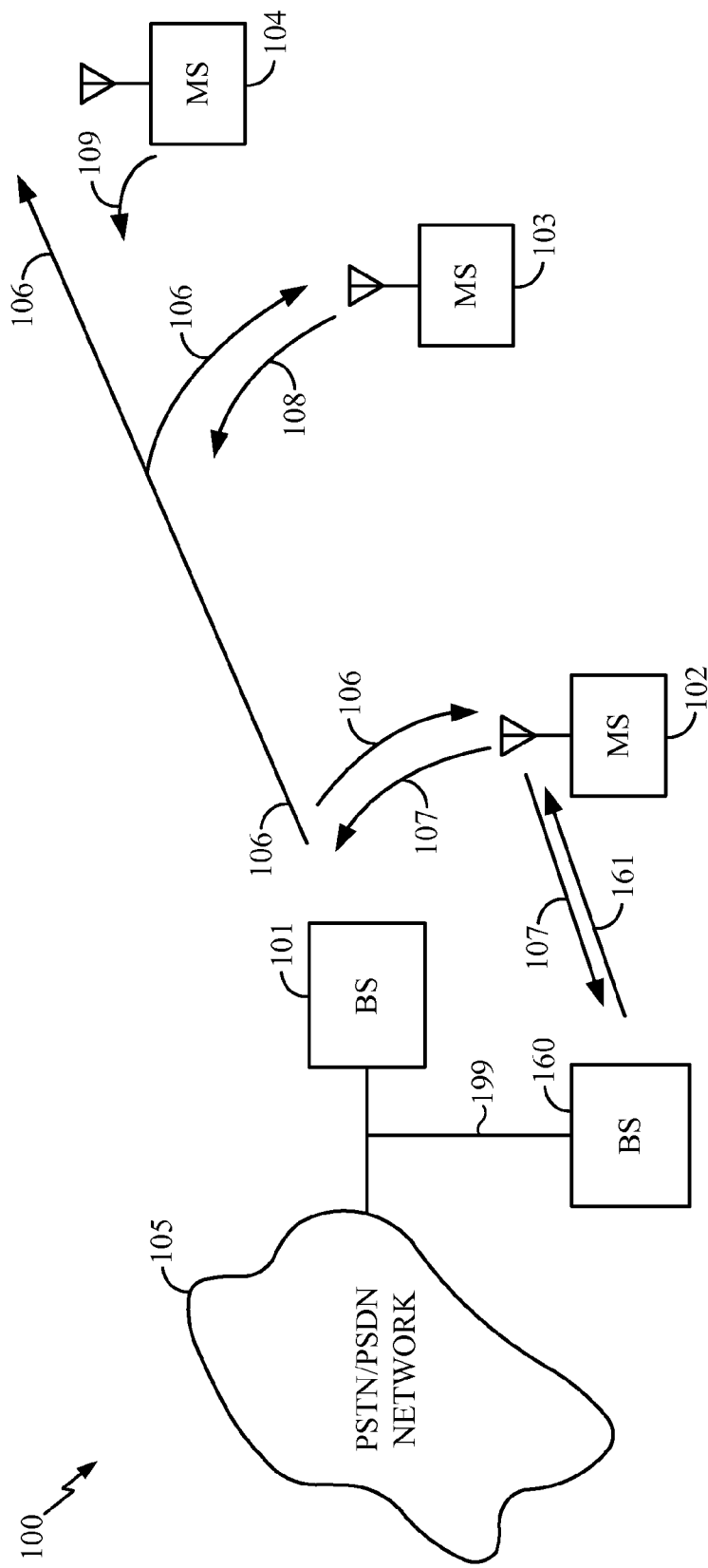
FIG. 1 illustrates a communication system 100 capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102-104, and between mobile stations 102-104 and a public switch telephone and data network 105. The mobile stations in FIG. 1 may be referred to as the data access terminals and the base station as the data access network without departing from the main scope and various advantages of the invention. The access terminals may be portable or stationary computers.

Base station 101 may include a number of components, such as a base station controller and a radio frequency transceiver. For simplicity, such components are not shown. Base station 101 may also be in communication with other base stations, for example base station 160. A controller (not shown) may control various operating aspects of the communication system 100 and particularly in relation to a backhaul 199 between network 105 and base stations 101 and 160.

Base station 101 communicates with each mobile station in a coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the information targeted for its user. Base station 101 may also communicate with the mobile stations 102-104 via a forward link signal transmitted from base station 160. Mobile stations 102-104 communicate with base stations 101 and 160 via corresponding reverse links. Each reverse link is maintained by a reverse link signal, such as reverse link signals 107-109 for respectively mobile stations 102-104.

In a soft handoff situation, base stations 101 and 160 may be communicating to a common mobile station in an overlapping coverage area. For example, mobile station 102 may be in the overlapping coverage area of base stations 101 and 160. Therefore, mobile station 102 may maintain communications with both base stations 101 and 160. On the forward link, base station 101 and 160 transmit respectively on forward link signals 106 and 161. On the reverse link, mobile station 102 transmits on reverse link signal 107 to be received by both base stations 101 and 160. For transmitting a data unit to mobile station 102 in soft handoff, mobile station 102 may select one of the base stations to be a serving base station for transmitting the data unit. The non-serving base station does not transmit the data unit on the forward link. On the reverse link, both base stations 101 and 160 may attempt to decode the traffic data transmission from the mobile station 102.

Figure 2:
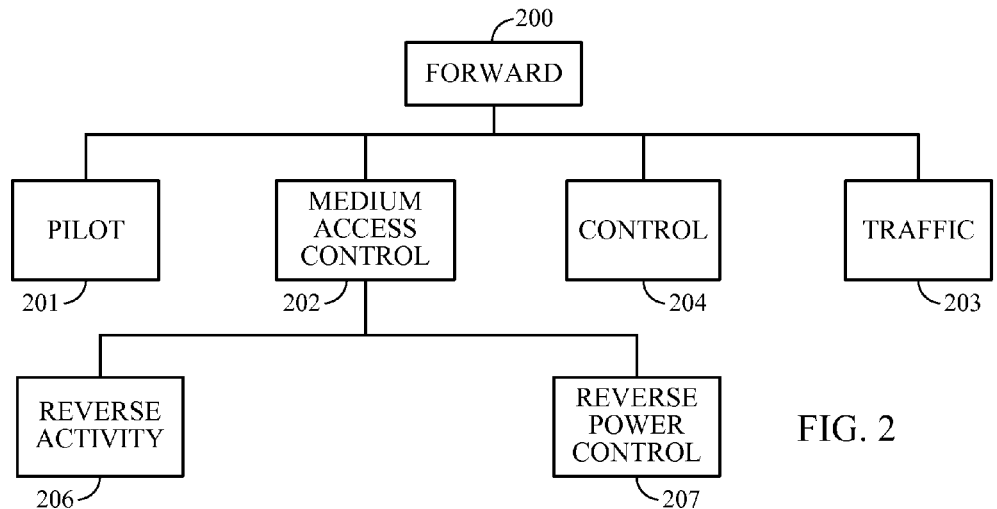
FIG. 2 illustrates an exemplary forward link channel structure.

FIG. 2 illustrates a forward channel structure 200 in accordance with an embodiment that may be used for communications on the forward link. Forward channel structure 200 may include a pilot channel 201, a medium access control (MAC) channel 202, a traffic channel 203 and a control channel 204. MAC channel 202 may include a reverse activity channel 206 and a reverse power control channel 207. Reverse activity channel 206 is used to indicate the activity level on the reverse link. Reverse power control channel 207 is used to control the power at which a mobile station can transmit on the reverse link.

Figure 3:
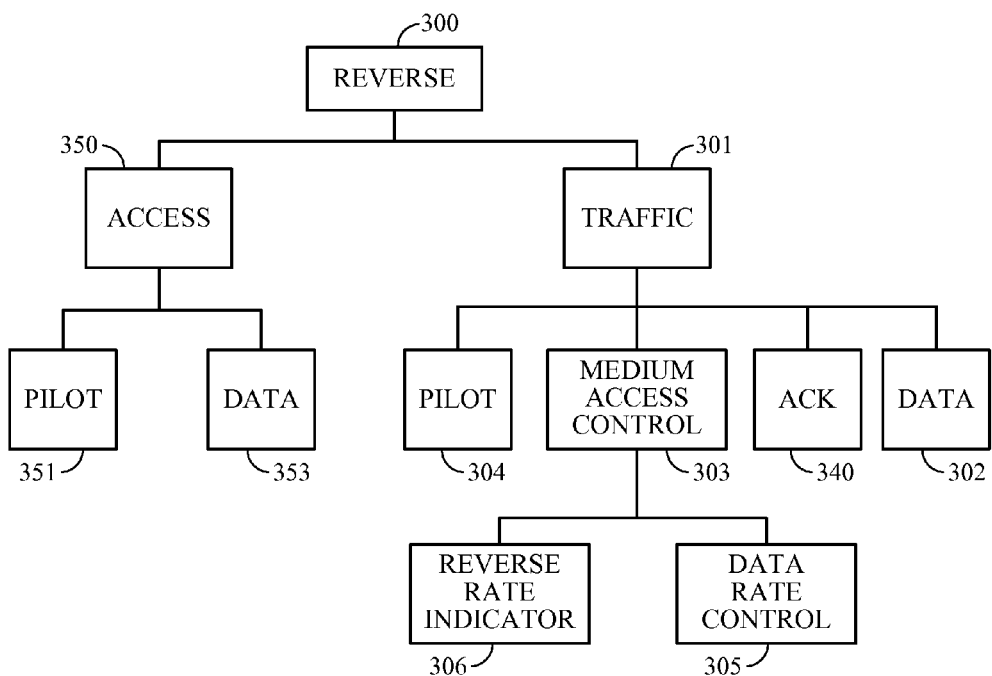
FIG. 3 illustrates an exemplary reverse link channel structure.

FIG. 3 illustrates, in accordance with an embodiment, a reverse channel structure 300 that may be used for communications on the reverse link. Reverse channel structure 300 includes an access channel 350 and a traffic channel 301. Access channel 350 includes a pilot channel 351 and a data channel 353. Traffic channel 301 includes a pilot channel 304, a MAC channel 303, an acknowledgment (ACK) channel 340 and a data channel 302. MAC channel 303 includes a reverse link data rate indicator channel 306 and a data rate control channel (DRC) 305. Reverse rate indicator channel 306 is used for indicating the rate at which a mobile station is currently transmitting. Data rate control channel 305 indicates a data rate that a mobile station is capable of receiving at a time on the forward link. ACK channel 340 is used for communicating after receiving each data unit whether a packet of data has been decoded successfully at a mobile station.

Data channel 302 may be used by a mobile station to communicate traffic data to the base station. For example, traffic data may include a request for receiving a data file on the forward link. Traffic data may also include commands and inputs from the mobile station user made via an interaction with the mobile station. The interaction may be via the mobile station keypad, display or voice command. For packet data application, the communications on the forward link traffic channel 203 is typically initiated in response to a communication on the reverse link data channel 302.

Figure 4:
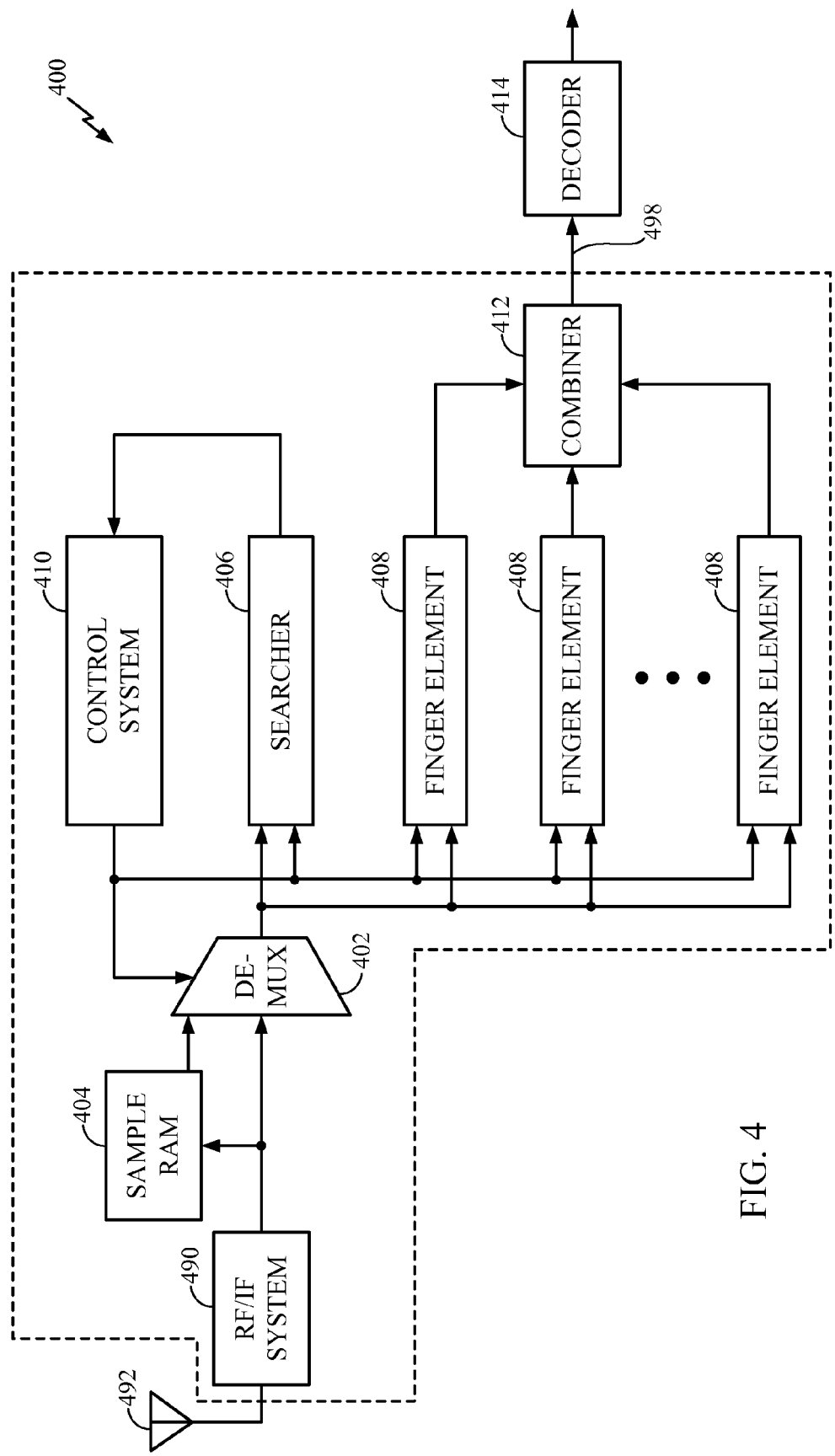
FIG. 4 illustrates a communication system receiver, for operation in a mobile station and a base station, capable of operating in accordance with various embodiments of the invention of the invention.

FIG. 4 illustrates a block diagram of a receiver 400 used for processing and demodulating a received CDMA signal. Receiver 400 may be used for decoding the information on reverse and forward links signals. Receive samples may be stored in RAM 404. Receive samples are generated by a radio frequency/intermediate frequency (RF/IF) system 490 and an antenna system 492. Antenna system 492 receives an RF signal, and passes the RF signal to RF/IF system 490. RF/IF system 490 may be any conventional RF/IF receiver. The received RF signals are filtered, down-converted and digitized to form the received samples at the base band frequencies. The samples are supplied to a demultiplexer (demux) 402. The output of demux 402 is supplied to a searcher unit 406 and finger elements 408. A control unit 410 is coupled thereto. A combiner 412 couples a decoder 414 to finger elements 408. Control unit 410 may be a microprocessor controlled by software, and may be located on the same integrated circuit or on a separate integrated circuit. The decoding function in decoder 414 may be in accordance with Viterbi algorithm or a turbo decoding algorithm.

During operation, receive samples are supplied to demux 402. Demux 402 supplies the samples to searcher unit 206 and finger elements 408. Control unit 410 configures finger elements 408 to perform demodulation of the received signal at different time offsets based on search results from searcher unit 406. The results of the demodulation are combined and passed to decoder 414. Decoder 414 decodes the received data symbols and outputs the decoded data symbols. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art.

The states of a data connection between a mobile station and a base station upon a successful connection setup may include a busy open state and an idle open state. When a connection is in a busy open state, the base station and the mobile station may exchange traffic data. The traffic data may originate from either the base station or the mobile station. Forward traffic channel 203 and data channel 302 may be used. In the idle open state, the base station and the mobile station may not exchange traffic data packet. Traffic data may not be exchanged for different reasons including the completion of delivery of a previously requested data file. When there is no traffic data to be exchanged, the state of the connection transitions from the busy open state to the idle open state. In the idle open state, the connection setup is not torn down; i.e. a link is available for possible data delivery. When traffic data becomes available for transmission from either the base station or the mobile station, the state of the connection transitions from the idle open state to the busy open state.

The base station may use the latest communicated data rate control information to transmit traffic data to the mobile station on the forward link traffic channel 203. During idle and busy open states, the mobile station may transmit data rate control information on DRC 305 to the base station. During busy open state, data rate control information is used for setting the data rate of the traffic data transmitted during the following time slots on the forward link traffic channel 203. During idle open state, the communications on DRC 305 is unnecessary because the forward link traffic channel 203 is not used for transmission of traffic data to the mobile station. When the state of the connection transitions from the idle open state to the busy open state, the data rate control information communicated on DRC 305 may become useful. Therefore, communications on DRC 305 during idle open state connection is unnecessary and excessive.

Figure 5:
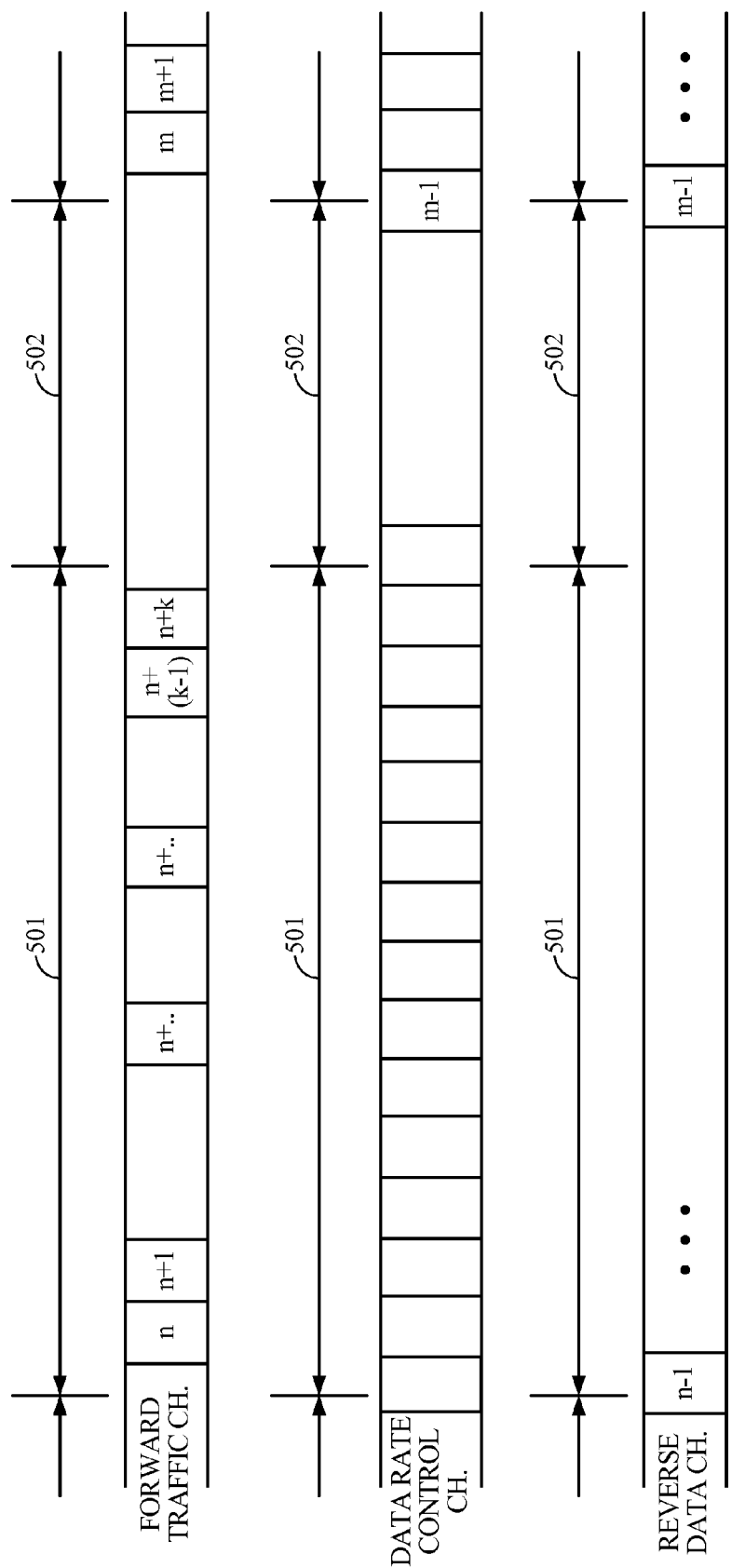
FIG. 5 illustrates an exemplary timing relationship between a forward link traffic channel, a data rate control channel and a reverse link data channel in accordance with various embodiments.

Referring to FIG. 5, an exemplary timing relationship between forward traffic channel 203 transmitted from a base station, DRC 305 and reverse data channel 302 transmitted from a mobile station is shown. The mobile station and the base station may have a data connection. During a time period 501, the data connection may be in the busy open state. The base station on the forward traffic channel 203 transmits data to the mobile station during busy open state time period 501. The data may be transmitted during several time slots. The mobile station transmits on the reverse link data rate control information on DRC channel 305 during the busy open state time period 501. The busy open state time period 501 may be preceded by at least a communication on the reverse data channel 302 on a time slot prior to time slot "n." The time slot may be a time slot "n−1." The data carried by the reverse data channel 302 during time slot "n−1," or any other time slot preceding time slot "n," may be, for example, a request for receiving a data file on the forward traffic channel 203 during the busy open state time period 501. The forward traffic channel 203 may begin transmitting data at the time slot "n." The delivery of the data file may be completed at the time slot "n+k."

After completing the delivery of the data file on the forward traffic channel 203 to the mobile station, and when the mobile station does not expect to receive any other files, including ACK or NAK of previously transmitted data packets, on the forward traffic channel 203, the mobile station may terminate transmission of data rate control information on the DRC 305, in accordance with various embodiments of the invention. Transmission of data rate control information on DRC 305 may begin at the same time or just prior to a request by the mobile station on the reverse data channel 302 for delivery of a data file on the forward traffic channel 203. Transmission of data rate control information on DRC 305 may alternatively begin at the same time or just prior to a start time of the busy open state time period 501. The mobile station may need to have an information about the start time of the busy open state time period 501. Transmission of data rate control information on DRC 305 may alternatively begin at the same time or just prior to a start time of the delivery of a data file on the reverse data channel 302. The mobile station may need to have an information about the delivery time.

The idle open state connection period may be the period between the termination of delivery of a data file on the forward traffic channel 203 and the start of a next delivery of a data file on the forward traffic channel 203. Such a time period is shown as a time period 502. At the end of time period 502 or near the end of time period 502, the mobile station may request for delivery of data. A request for deliver of data on data channel 302 may terminate the idle open state 502. The transmission of data rate control information on DRC 305 may begin nearly at the same time as the termination time of the idle open state time period 502, in accordance with various embodiments of the invention. Transmission on DRC 305 may begin, for example, at the time slot "m−1," as shown in FIG. 5. The transmission on DRC 305 may alternatively begin at the same time as the transmission of the request for a data file on the reverse data channel 302.

Figure 6:
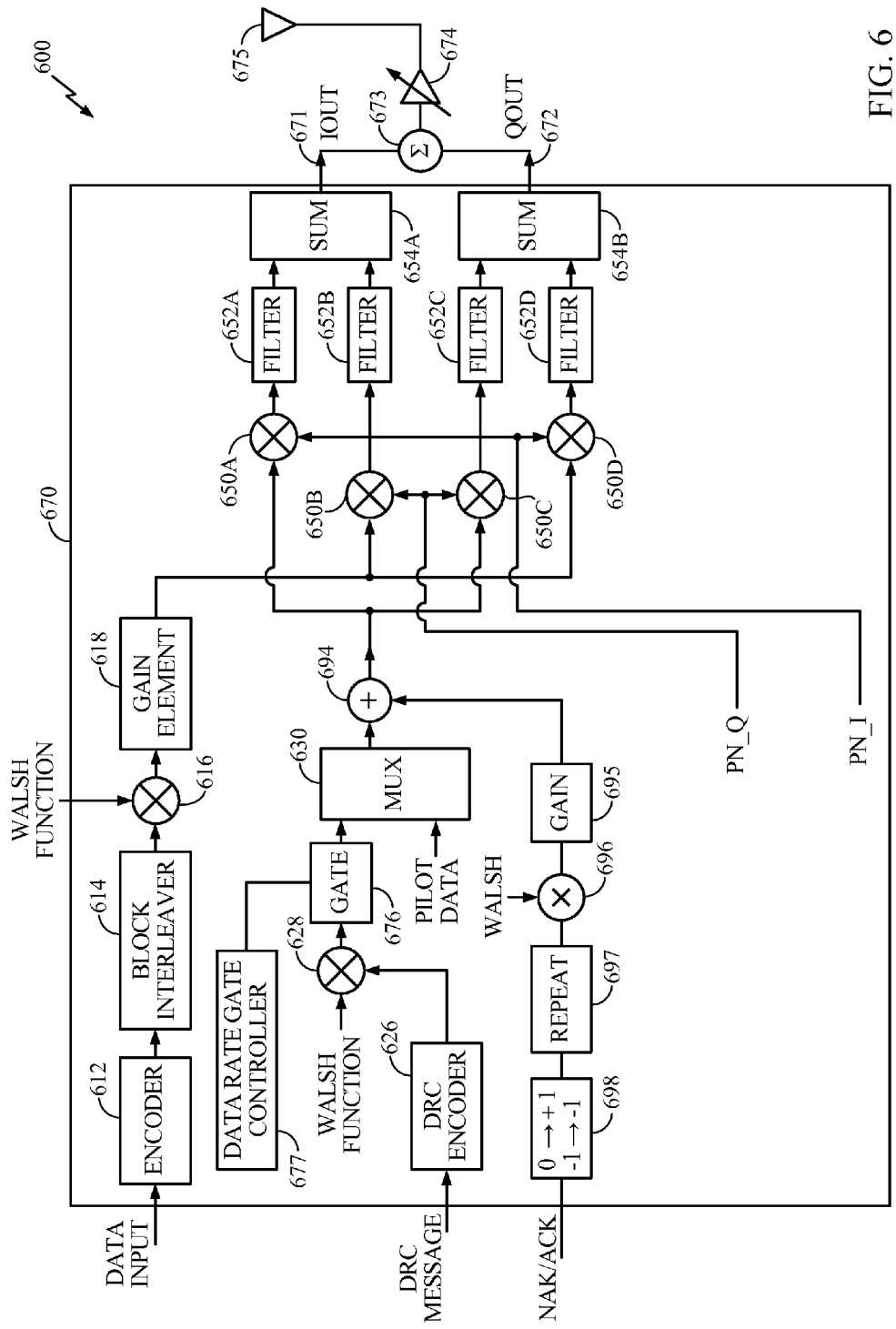
FIG. 6 illustrates a block diagram of a transmitter for use in a mobile station in accordance with various embodiments of the invention.

Referring to FIG. 6, a block diagram of a transmitter 600 in accordance with various embodiments for use in a mobile station is shown. Various data from different channels input a pre-transmit processing block 670 to produce I and Q signals 671 and 672. Signals 671 and 672 are summed in a summer 673. The summed signal is amplified in an amplifier 674. The amplified signal is transmitted from an antenna 675 to the base station.

An encoder 612 encodes data for transmission, for example, on data channel 302. The encoded data passes through a block interleaver 614. The interleaved data is Walsh covered in a multiplier 616. The Walsh covered output passes through a channel gain adjustment in block 618 for in-phase and quadrature (I&Q) modulations in multipliers 650A-D. The ACK/NAK information for transmission on ACK channel 340 passes through level adjustments in block 698. The output data may be repeated in block 697, and Walsh covered in multiplier 696. The output passes through a gain adjustment block 695. A summer 694 may sum the data on the ACK channel 340, the pilot data on pilot channel 304 and the data on DRC 305.

An encoder 626 encodes the data rate control information for transmission on DRC 305. The encoded data is Walsh covered in a multiplier 628. In accordance with various embodiments, the data rate control information may be gated by a DRC block 676. A DRC gate controller 677, in accordance with various embodiments, may control the operations of the DRC gate block 676. The DRC gate block 676, for gating transmission on DRC 305, may be placed at different locations along the DRC 305 modulation path. The DRC gate block 676 may be placed after the Walsh covered operation. The Walsh covered data rate information may be ready for an immediate transmission after DRC gate controller 677 enables the transmission. In accordance with various embodiments, the transmission of data rate control information may cease after termination of the busy open state time period 501, and resume before or about the same time as the start of the next busy open state period.

The DRC gate controller 677 may trigger the resumption of transmission on DRC 305 based on availability of data for transmission on data channel 302, in accordance with an embodiment. Encoder 612 may receive the data for transmission on data channel 302. After completing the delivery of the data file on the forward traffic channel 203 to the mobile station, and when the mobile station does not expect to receive any other files on the forward traffic channel 203, DRC gate controller 677 may terminate transmission of data rate control information on the DRC 305, in accordance with an embodiment. DRC gate controller 677 may allow transmission of data rate control information on DRC 305 at the same time or just prior to a request by the mobile station on the reverse data channel 302 for delivery of a data file on the forward traffic channel 203, in accordance with an embodiment. DRC gate controller 677 may allow transmission of data rate control information on DRC 305 to alternatively begin at the same time or just prior to a start time of the busy open state time period 501, in accordance with an embodiment. The mobile station may need to have an information about the start time of the busy open state time period 501. DRC gate controller 677 may allow transmission of data rate control information on DRC 305 to alternatively begin at the same time or just prior to a start time of the delivery of a data file on the reverse data channel 302, in accordance with an embodiment. The mobile station may need to have an information about the delivery time.

At the end of time period 502 or near the end of time period 502, the mobile station may request for delivery of data by transmitting some data on data channel 302. DRC gate controller 677 may allow the transmission of data rate control information on DRC 305 to begin nearly at the same time as the termination time of the idle open state time period 502, in accordance with various embodiments of the invention. DRC gate controller 677 may allow transmission on DRC 305 to begin, for example, at the time slot "m−1," as shown in FIG. 5. DRC gate controller 677 may allow the transmission on DRC 305 to alternatively begin at the same time as the transmission of the request for a data file on the reverse data channel 302, in accordance with an embodiment.

The encoded data from DRC 305, ACK channel 340 and data channel 302, and pilot data on channel 304 may pass through I&Q modulator 650A-D, filters 652A-D and summers 654A-B as shown to produce I and Q signals 671 and 672 for transmission.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A non-transitory storage medium having a software module residing thereon, the software module executable by a processor to:
    communicate a request from a mobile station to a base station for delivery of a data file on a traffic channel from the base station to the mobile station;
    communicate data rate control information on a data rate control channel from the mobile station to the base station; and
    cease communication of data rate control information on the data rate control channel from said mobile station to said base station if the delivery of the data file on the traffic channel from said base station to said mobile station is concluded.

2. The non-transitory storage medium of claim 1, wherein communication of data rate control information on the data rate control channel begins at a same time as the communicating the request from the mobile station to the base station for delivery of the data file on the traffic channel.

3. The non-transitory storage medium of claim 1, wherein communication of data rate control information on the data rate control channel begins prior to the communicating the request from the mobile station to the base station for delivery of the data file on the traffic channel.

4. A non-transitory storage medium having a software module residing thereon, the software module executable by a processor to:
    communicate data rate control information on a data rate control channel from a mobile station to a base station;
    conclude a delivery of a data file on a reverse traffic channel from the mobile station to the base station; and
    cease, in response to the concluding of the delivery of the data file on the reverse traffic channel from the mobile station to the base station, communicating data rate control information on the data rate control channel from the mobile station to the base station.

5. A non-transitory storage medium having a software module residing thereon, the software module executable by a processor to:
    receive data rate control information via a gate; and
    control the gate by allowing transmission of data rate control information, through the gate, during a busy open state and by ceasing transmission of data rate control information after transitioning from the busy open state to an idle open state.

6. The non-transitory storage medium of claim 5, wherein the software module is further executable to:
    encode data rate control information to produce encoded data rate control information; and
    transmit the encoded data rate control information to a base station.

7. A non-transitory storage medium having a software module residing thereon, the software module executable by a processor to:
- determine a state of a connection between a mobile station and a base station;
- transmit data rate control information from the mobile station to the base station if the connection state is busy; and
- cease the transmission of data rate control information if the connection state transitions from busy to idle.

8. The non-transitory storage medium of claim 7, wherein the software module is further executable to:
- after the transmission has been ceased, transmit data rate control information from the mobile station to the base station if the connection state transitions from idle to busy.

9. An apparatus for communicating data rate control information comprising:
- means for communicating a request from a mobile station to a base station for delivery of a data file on a traffic channel from the base station to the mobile station;
- means for communicating data rate control information on a data rate control channel from the mobile station to the base station; and
- means for ceasing communication of data rate control information on the data rate control channel from said mobile station to said base station if the delivery of the data file on the traffic channel from said base station to said mobile station is concluded.

10. The apparatus of claim 9, wherein communication of data rate control information on the data rate control channel begins at a same time as the communicating the request from the mobile station to the base station for delivery of the data file on the traffic channel.

11. The apparatus of claim 9, wherein communication of data rate control information on the data rate control channel begins prior to the communicating the request from the mobile station to the base station for delivery of the data file on the traffic channel.

12. An apparatus for communicating data rate control information comprising:
- means for communicating data rate control information on a data rate control channel from a mobile station to a base station;
- means for concluding a delivery of a data file on a reverse traffic channel from the mobile station to the base station; and
- means for ceasing, in response to the concluding of the delivery of the data file on the reverse traffic channel from the mobile station to the base station, communicating data rate control information on the data rate control channel from the mobile station to the base station.

13. An apparatus configured for wireless communication, the apparatus comprising:
- at least one processor; and
- a memory coupled to the at least one processor,
- wherein the at least one processor is configured:
  - to communicate a request from a mobile station to a base station for delivery of a data file on a traffic channel from the base station to the mobile station;
  - to communicate data rate control information on a data rate control channel from the mobile station to the base station; and
  - to cease communication of data rate control information on the data rate control channel from said mobile station to said base station if the delivery of the data file on the traffic channel from said base station to said mobile station is concluded.

14. The apparatus of claim 13, wherein communication of data rate control information on the data rate control channel begins at a same time as the communication of the request from the mobile station to the base station for delivery of the data file on the traffic channel.

15. The apparatus of claim 13, wherein communication of data rate control information on the data rate control channel begins prior to the communication of the request from the mobile station to the base station for delivery of the data file on the traffic channel.

16. An apparatus configured for wireless communication, the apparatus comprising:
- at least one processor; and
- a memory coupled to the at least one processor,
- wherein the at least one processor is configured:
  - to communicate data rate control information on a data rate control channel from a mobile station to a base station;
  - to conclude a delivery of a data file on a reverse traffic channel from the mobile station to the base station; and
  - to cease, in response to the concluding of the delivery of the data file on the reverse traffic channel from the mobile station to the base station, communicating data rate control information on the data rate control channel from the mobile station to the base station.

17. An apparatus configured for wireless communication, the apparatus comprising:
- at least one processor; and
- a memory coupled to the at least one processor,
- wherein the at least one processor is configured:
  - to determine a state of a connection between a mobile station and a base station;
  - to transmit data rate control information from the mobile station to the base station if the connection state is busy; and
  - to cease the transmission of data rate control information if the connection state transitions from busy to idle.

18. The apparatus of claim 17, wherein the at least one processor is further configured to:
- transmit, after the transmission has been ceased, data rate control information from the mobile station to the base station if the connection state transitions from idle to busy.

* * * * *